Patented Nov. 2, 1948

2,453,086

UNITED STATES PATENT OFFICE 2,453,086

ALKYL THIOPHENE-ALDEHYDE SYNTHETIC RESINS

Philip D. Caesar, Champaign, Ill., assignor to Socony-Vacuum Oil Company, Incorporated, a corporation of New York No Drawing. Application December 18, 1947, Serial No. 792,620

12 Claims. (Cl. 260—57)

This invention relates to the condensation of alkyl thiophene with aldehydes, and is more particularly concerned with the method of preparing valuable synthetic resins through the condensation of alkyl thiophenes with aldehydes and/or the co-condensation of alkyl thiophenes and phenol with aldehydes.

Condensation reactions are well known and connote reactions that involve the union, under suitable conditions, between atoms in the same or different molecules to form new compounds of greater complexity and higher molecular weight. Ordinarily, the condensation is effected in the presence of materials, known in the art as condensing agents, that facilitate the union. The nature of the products obtained in condensation operations depends, of course, upon the type of reactants involved, the character of the condensing agents, the relative concentration of the reactants, and on the temperature, pressure, and time of reaction employed, usually referred to as condensation reaction conditions.

Condensation reactions form the basis of many processes for manufacturing some of the most important synthetic resins. These synthetic resins may be liquids, semi-solids or solids, depending upon the nature and conditions of the condensation reactions. However, they have the common properties of being amorphous, of having no tendency to crystallize, and of having somewhat complex molecular structures.

As is well known to those familiar with the art, it has been proposed to carry out the condensation of thiophene with aldehydes in the presence of appreciable amounts, of the order of 100% and up to 200%, based on the weight of thiophene in the charge, of phosphorus pentoxide as condensing agent. The products of this reaction have been invariably compounds, the molecules of which contain one or two thiophene groups. In accordance with this method of the prior art, the condensation of thiophene with formaldehyde appears to proceed as follows:

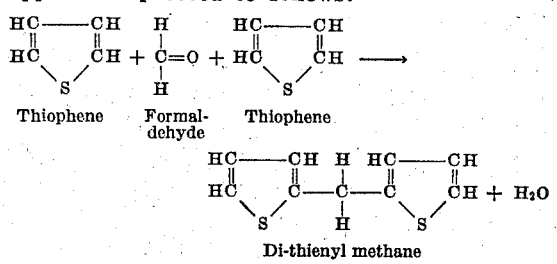

Di-thienyl methane

More recently, it has been proposed to carry out the reaction of thiophene with aldehydes in the presence of excess amounts, of the order of 300% and over, based on the weight of thiophene in the charge, of hydrochloric acid. In this case, in addition to thienylmethyl chloride, di-thienyl methane is formed as a main product of the reaction. The chloromethylation of aromatic hydrocarbons through the use of hydrochloric acid and formaldehyde is well known in the art, and when applied to thiophene instead of aromatic hydrocarbons, a portion, at least, of the thiophene is chloromethylated. This would seem to account for the production of substantial amounts of thienylmethyl chloride in accordance with the equation:

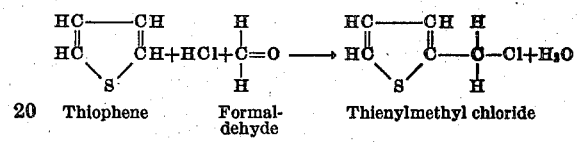

Thiophene    Formaldehyde    Thienylmethyl chloride

The fact that appreciable amounts of dithienyl methane are also produced may be ascribed to the reactive nature of thienylmethyl chloride. It is believed that thienylmethyl chloride, in the presence of additional amounts of thiophene, reacts therewith causing HCl to split off to produce dithienyl methane in accordance with the following equation:

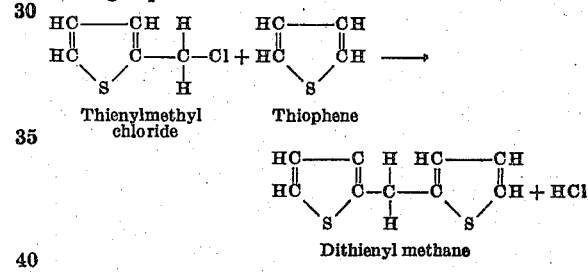

Dithienyl methane

It may be stated, therefore, that the condensation of thiophene with aldehydes, in accordance with the methods known to the prior art, produced liquid or crystalline compounds having comparatively simple molecular structures and well-established chemical formulae.

A copending application, Serial Number 524,622, filed March 1, 1944, now abandoned, in which the inventor of the present application is a co-inventor, is directed to a method of preparing valuable synthetic resins, which comprises reacting thiophene or a mixture of thiophene and phenol, with an aldehyde, in the presence of an acidic condensing agent in controlled concentrations, and correlating the nature of the aldehyde condensation reactant and of the acidic condensing agent, and the concentration of the acidic condensing agent used, together with the temperature and time of reaction to effect resinification.

In accordance with the method set forth in this copending application, a novel type of condensation reaction between thiophene and aldehydes is achieved. This new type of condensation reaction is effected in the presence of well known acidic condensing agents; however, the concentration of the condensing agents employed and the condensation conditions are closely controlled. As contrasted with the reactions involving thiophene and aldehydes of the prior art, the reaction does not yield liquid or crystalline compounds having comparatively simple molecular structures and well established chemical formulae; but rather, through the use of controlled concentrations of well known acidic condensing agents, and by carrying out the reaction under controlled condensation reaction conditions, it produces amorphous substances having complex molecular structures and useful as synthetic resins.

As a result of the new type of condensation reaction between thiophene and aldehydes described in this copending application, a liquid product, a resilient rubber-like product, or a solid product may be produced. These three products are modifications of the condensation reaction product that is formed and represent various stages of resinification. In the copending application referred to, this novel type of condensation of thiophene with aldehydes was postulated to proceed as follows: A primary reaction produces a thienyl methanol in accordance with the equation:

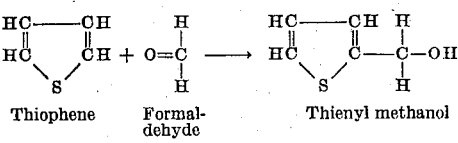

Thiophene    Formaldehyde    Thienyl methanol

Further condensation of the alcohol is accompanied by the splitting off of water to produce the condensation products in accordance with the following formula:

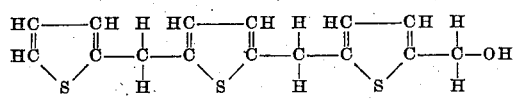

The degree of condensation and the molecular weight of the product obtained depend upon a number of reaction variables discussed in detail in the copending application referred to, the degree of condensation establishing the stage of resinification achieved and thereby determining whether the product obtained will be a liquid, a resilient rubber-like mass, or a solid, the solid product being characterized by a substantially complete absence of hydroxyl groups and representing the ultimate stage of resinification, the liquid product representing more or less the first stage of resinification, and the resilient rubber-like mass representing intermediate stages of resinification.

In so far as I am aware, no attempt has ever been made to effect the condensation of alkyl thiophenes with aldehydes. It must be noted that because of the alkyl side-groups, particularly in the case of polyalkyl thiophenes, and in accordance with the mechanism postulated in the copending application referred to for the condensation of thiophene with aldehydes, there are fewer active hydrogen atoms available and, therefore, it is more difficult to obtain high molecular weight condensation products than from thiophene and even monoalkyl thiophenes. This, however, is not the case for all dialkyl thiophenes. In accordance with the present invention, 3,4-dimethyl thiophene:

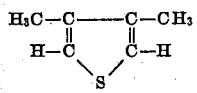

will condense with aldehydes to produce relatively high molecular weight condensation products. This is due to the fact that the two most active hydrogen atoms, those on the two carbons that are alpha to the sulfur atom, are still available.

I have now found that valuable synthetic resins may be prepared by condensing alkyl thiophenes with aldehydes through the use of acidic condensing agents in controlled concentrations and under controlled condensation reaction conditions.

I have also found that valuable synthetic resins may be prepared by co-condensing alkyl thiophenes and phenol and/or thiophene with aldehydes, likewise through the use of acidic condensing agents in controlled concentrations and under controlled condensation reaction conditions.

It must be understood that by the term alkyl thiophenes, I mean monoalkyl thiophenes as well as polyalkyl thiophenes; however, and in the interest of brevity, monoalkyl thiophenes and polyalkyl thiophenes will be referred to hereinafter as alkyl thiophenes.

It must be observed that by valuable synthetic resins, I have reference to liquid and solid materials that can be molded or cast into forms or shapes which have considerable mechanical strength. Many condensation reactions produce powders which cannot be molded and which lack desirable mechanical properties almost entirely. For instance, the condensation of aromatic hydrocarbons with formaldehyde produces so-called formalites in the form of powders which cannot be molded under any conditions of temperature and pressure. Such powders may be used only as fillers in the fabrication of various plastics.

Accordingly, it is an object of the present invention to provide a method of effecting the condensation of alkyl thiophenes with aldehydes. Another object is to provide a method of effecting the co-condensation of alkyl thiophenes and phenol and/or thiophene with aldehydes. A more specific object is to provide a method of preparing valuable synthetic resins. A very important object is to afford a method capable of carrying out the above objects by effecting the condensation operation through the use of acidic condensing agents in controlled concentrations and under controlled condensation reaction conditions. Other objects and advantages of the present invention will become apparent to those skilled in the art from the following description.

Broadly stated, my invention provides a method of preparing valuable synthetic resins, which comprises reacting alkyl thiophenes or a mixture of alkyl thiophenes and phenol and/or thiophene, with an aldehyde, in the presence of an acidic condensing agent in controlled concentrations, and correlating the nature of the aldehyde and of the acidic condensing agent, and the concentration of the acidic condensing agent used, together with the temperature and time of reaction to effect resinification.

The rate and control of the condensation reaction between alkyl thiophenes and aldehydes, and between alkyl thiophenes, thiophene and/or phenol and aldehydes are similar to the rate and control of the condensation reaction between thiophene and aldehydes, as set forth in the copending application referred to hereinbefore. Accordingly, they depend upon many factors. These may be listed as follows:

1. Nature of acidic condensing agent
2. Concentration of acidic condensing agent used
3. Nature of aldehyde
4. Ratio of aldehyde to alkyl thiophene
5. Temperature
6. Time
7. Character of the system These factors may vary in character or magnitude, hence, they may be referred to, more appropriately, as reaction variables. It must be understood, however, that they are more or less interdependent, therefore, when one is arbitrarily fixed, the limits within which the others may be varied are somewhat restricted. In any particular case, for instance, with a given acidic condensing agent and a given aldehyde, the most desirable magnitude of each of the remaining reaction variables can be readily ascertained by one skilled in the art, the limits within which these reaction variables may vary being indicated hereinafter.

As stated hereinbefore, any of the well known acidic condensing agents is suitable for the method of my invention. Generally speaking, acids and salts of a weak base and a strong acid have been found to be very effective condensing agents for carrying out the condensation reaction. By way of non-limiting examples, sulfuric acid, trichloroacetic acid, hydrochloric acid, maleic acid, phosphoric acid, oxalic acid, and anhydrous hydrofluoric acid may be mentioned as suitable acids, while ammonium chloride, zinc chloride, mercuric chloride, and ammonium sulphate may be mentioned as suitable salts for use as condensing agents in the condensation reaction of the present invention. I have found, however, that the nature of the condensing agent employed affects the time and temperature required to effect the condensation. With respect to the acids and salts referred to, it may be stated that their condensing activity varies directly with the strength of the acid used as condensing agent, or with the strength of the acid produced by hydrolysis of the salt used as condensing agent. Hence, the time and temperature required to effect the condensation vary inversely as the strength of the acid employed or of the acid produced by hydrolysis. It must be understood, that when I speak of strength of the acid, I have reference to the degree of ionization, and not to the concentration of acid employed or produced.

If a strong acid, for example, sulfuric acid, is employed as condensing agent, in practice, the amount used is small and varies between 0.1% and 10% by weight based on the weight of the alkyl thiophene reactant, although the total amount used, if desired, may be many times the weight of the alkyl thiophene in the charge. On the other hand, if a weak acid, for example, maleic acid or tartaric acid, is employed as condensing agent, the amounts are proportionately greater, and in practice vary between 10% and 100% by weight, based on the weight of the alkyl thiophene reactant, although, again, the total amount used may be many times the weight of the alkyl thiophene in the charge. Generally speaking, it may be stated that the amount of acidic condensing agent used in the method of the present invention varies inversely with the strength of the acid employed or with the strength of the acid produced by the hydrolysis of the salt employed.

In contrast with the reactions of the prior art involving thiophene and aldehydes, the concentration of the acidic condensing agent used in the method of the present invention must be rigidly controlled. For example, sulfuric acid which is the preferred condensing agent, is so active that polymerization, oxidation, sulfonation, etc., of the alkyl thiophene occur readily. Since, as stated hereinbefore, relatively only small amounts of sulfuric acid are necessary to carry out the condensation reaction of my invention, and since even small amounts of sulfuric acid cause the secondary reactions referred to, to occur to an appreciable extent, I have found it necessary to use sulfuric acid with suitable diluents. Accordingly, and by way of non-limiting examples, I may use 10% solutions of concentrated sulfuric acid in glacial acetic acid or 50% solutions of concentrated sulfuric acid in water, in quantities necessary to produce the desired amounts of sulfuric acid as condensing agent. Thus, as stated hereinbefore, the amount of sulfuric acid used can be many times (200% and above) by weight, the weight of the alkyl thiophenes in the charge, provided that a sufficient amount of water is added so that the concentration of the aqueous sulfuric acid solution obtained is less than 80%, preferably, less than 60% sulfuric acid by weight, a concentration of less than 30% being especially preferred. Above 80% concentration, aqueous solutions of sulfuric acid will cause sludgy resinification of the alkyl thiophene reactant itself. As mentioned hereinbefore, glacial acetic acid may be used as a diluent for the sulfuric acid, but the diluent effects of water and of glacial acetic acid are very different, acetic acid decreasing the condensation activity of condensing agents such as sulfuric acid and anhydrous hydrofluoric acid, relatively little, when compared with water. It must be noted that condensing agents such as anhydrous hydrochloric acid, maleic acid, and tartaric acid do not ionize in anhydrous media having low dielectric constants, and hence, will not cause resinification in such media as will the ionizable sulfuric acid and anhydrous hydrofluoric acid. I have found that when glacial acetic acid is used as the diluent, the concentration of sulfuric acid in the glacial acetic acid-sulfuric acid solution should be less than 30%, and, preferably, less than 10%.

Since then, in accordance with my invention, the concentration of the condensing agent used is a very important factor, it must be noted that the amount of condensing agent utilized is governed to some extent by the character of the system. For example, other reaction variables being constant, if the system is anhydrous and if sulfuric acid is the condensing agent, water or glacial acetic acid must be added prior to the addition of the condensing agent in amounts to produce, when the appropriate amounts of sulfuric acid are ultimately added, a solution of condensing agent having a concentration falling within the ranges indicated hereinbefore. On the other hand, if water is present, sulfuric acid in amounts of at least 0.1% based on the weight of the alkyl thiophenes in the charge, but not exceeding an amount which would produce an aqueous solution of sulfuric acid in the charge greater than 80%, preferably, 60% concentration is used.

Any aldehyde or any aldehyde-containing material or any product obtained by subjecting aldehydes to polymerization reactions may be used as the aldehyde condensation reactant in the method of my invention. Formaldehyde, paraldehyde, paraformaldehyde, benzaldehyde and formalin solutions may be mentioned by way of non-limiting examples, as suitable aldehyde condensation reactants. In the preferred embodiment of my invention, the manufacture of synthetic resins, I prefer to use formaldehyde or paraldehyde. I have found, however, that the nature of the aldehyde condensation reactant likewise affects the time and temperature required for effecting the desired condensation reaction. Other reaction variables remaining constant, the rate of condensation will be a maximum for low-molecular weight aldehydes.

The ratio of aldehyde condensation reactant to alkyl thiophene reactant controls the rate of condensation. I have found that a substantial excess of aldehyde reactant shows a tendency to shorten the reaction time and at the same time increases the yield of synthetic resin. Therefore, in general, I use a reaction mixture wherein the molar ratio of aldehyde reactant to alkyl thiophene reactant is at least 1:1, respectively. Ordinarily, I prefer to use a charge in which the aldehyde reactant and the alkyl thiophene reactant are present in a molecular proportion falling within the range varying between 2:1 and 1:1, respectively, although under the conditions of condensation of the method of my invention, the condensation comprises reacting an alkyl thiophene with an aldehyde reactant in a mole ratio of 1:1. If an excess of alkyl thiophene reactant or of aldehyde reactant is employed, it can be recovered substantially quantitatively after completion of the reaction. Even if a charge in which the alkyl thiophene reactant and aldehyde reactant are present in mole proportions of two or more to one, respectively, is subjected to the condensation conditions of my invention, there is no evidence that compounds, such as dithienyl methane are formed. Apparently, in accordance with the process of the present invention, the reaction will always involve one mole of aldehyde and one mole of an alkyl thiophene, whether the alkyl thiophene reactant or the aldehyde reactant are in molar excess over the other or not. In my method of carrying out the condensation of alkyl thiophenes with aldehydes, the reaction products are invariably liquids that are insoluble in hydrocarbons, or resilient rubber-like masses or solids synthetic resins.

The temperature and time of reaction to be employed in the method of the present invention, as stated hereinbefore, must be carefully controlled. The temperature may vary between 20° C. and 120° C., although, ordinarily, I prefer to use temperatures varying between 40° C. and 100° C. As noted already, the temperature and time of reaction are governed to a considerable extent by the nature of magnitude of the other reaction variables, and, predominantly, by the nature and concentration of the acid used as condensing agent, or by the nature and concentration of the acid produced by hydrolysis of the salt employed as condensing agent. Hence, the optimum temperature and time for effecting a given condensation reaction, in accordance with the method of the present invention, must be determined by one skilled in the art, the essential factor to be considered, in addition to the temperature and time of reaction for obtaining the synthetic resins of my invention, being the concentration of condensing agent employed.

In accordance with my invention, valuable synthetic resins may be obtained also by co-condensing alkyl thiophenes and phenol and/or thiophene with aldehydes. The proportion of alkyl thiophene to phenol in the charge may be changed at will to produce resins having a wide range of toughness and strength. Ordinarily, the molar ratio of alkyl thiophene reactant to phenol varies between 6:1 and 1:1, respectively. The reaction in this case likewise involves one molecular weight of aldehyde for each molecular weight of phenol and of alkyl thiophene. As in the condensation of alkyl thiophenes with aldehydes in accordance with the method of the present invention, the concentration of condensing agent and the condensation conditions are carefully controlled, the procedure for effecting the co-condensation of alkyl thiophenes and phenol with aldehydes to produce valuable synthetic resins being similar to the procedure for effecting the condensation of alkyl thiophenes with aldehydes.

The nature of the products obtained in accordance with the present invention, depends somewhat upon whether monoalkyl thiophenes, dialkyl thiophenes or trialykl thiophenes are used in the condensation or co-condensation reactions. For instance, monoalkyl thiophenes can be reacted with aldehydes to produce liquid condensates which can be further condensed to form hard, heat and solvent-resistant protective coatings. These liquid or solid condensation products can be reacted with drying oils such as oiticica oil, linseed oil, perilla oil, dehydrated castor oil, and China-wood oil to produce viscous, varnish-like products. These latter products can be thinned with any of the conventional thinners without precipitating out the condensates. These condensation products can be obtained either by the condensation of monoalkyl thiophenes having three through eight carbon atoms in the side chain with formaldehyde, or by the condensation of monoalkyl thiophenes having less than three carbon atoms in the side chain, with paraldehyde or higher aldehydes. Paraldehyde more or less constitutes the lower limit of aldehydes capable of condensing with monoalkyl thiophenes having less than three carbon atoms in the side chain to form oil-soluble varnish-type resins. The upper limit does not require such clear definition because the more carbons in the side chain, the more oil-soluble the resin will be, as is well understood in the art. Moreover, the product obtained by the condensing monoalkyl thiophenes having less than three carbon atoms in the side chain with formaldehyde may be made completely oil-soluble by fusion with rosin, ester gums, polycoumarones, and the like, and mixtures thereof. Additional modifications of these products can be obtained by co-condensing monoalkyl thiophenes and thiophenes and/or phenol with aldehydes.

Likewise, dialkyl thiophenes or trialkyl thiophenes can be condensed with aldehydes to produce liquid and solid condensation products. However, and as stated hereinbefore, where dialkyl and trialkyl thiophenes are employed, it is more difficult to obtain high molecular weight condensation products. This, however, is not the case for all dialykyl thiophenes. As already noted, when the hydrogen atoms are in the alpha position with respect to the sulfur atom in the thiophene molecule, it is possible to effect the condensation reaction to produce relatively high molecular weight condensation products.

Generally speaking, since the molecular weight of a condensation product determines more or less whether it is a liquid, a rubber-like mass, or a solid, and since, in view of the foregoing, the degree and nature of alkylation of the thiophene molecule determines the extent of condensation achieved, other variables remaining constant, in accordance with the present invention, I can produce liquid condensation products, resilient rubber-like masses, and solid products. These products have properties that make them amenable to a wide variety of industrial applications. Thus, the liquid condensation products may be used in the paint and varnish industry, in the manufacture of laminated products and impregnated wood, and can be applied to surfaces to produce highly desirable protective coatings. The resilient rubber-like masses can be worked, pressed, and extruded into any desired shape or form. They can be cured under pressure and heated into hard thermosetting types of resins. The solid products can be cast, molded and comminuted into a wide variety of finished and intermediate products having great usefulness in industry.

The following detailed examples are for the purpose of illustrating modes of preparing the condensation products of my invention, it being clearly understood that the invention is not to be considered as limited to the specific reactants disclosed hereinafter or to manipulations and conditions set forth in the examples. As it will be apparent to those skilled in the art, a wide variety of other condensation products within the scope of my invention may be prepared by a suitable modification of the reactants.

*Example 1*

Forty parts by weight of tertiary butyl thiophene, 40 parts by weight of a formalin solution containing about 36% formaldehyde (a 1:2 molecular ratio) and 3 parts by weight of 95% sulfuric acid were placed in a glass tube, the tube was sealed and the mixture was shaken for 40 hours at a temperature of 80–85° C. An oily material was separated from the aqueous layer and dehydrated for one hour at 80° C. under a 5 mm. vacuum.

Forty-five parts by weight of a red-brown viscous liquid were recovered. This product could be readily dissolved in benzene.

Fifteen parts by weight of this red-brown viscous liquid were mixed with 30 parts by weight of bodied linseed oil, and the mixture was heated to a temperature of 293° C. and kept at this temperature for 20 minutes. A dark-red uniform viscous oil was obtained which kept its uniformity upon the addition of a thinner.

Upon analysis, this product was found to contain 3.2% sulfur.

*Example 2*

Twenty-five parts by weight of methyl thiophene, 50 parts by weight of a formalin solution containing about 36% formaldehyde (a 1:3 molecular ratio) and 2.5 parts by weight of 95% sulfuric acid were placed in a 3-neck flask and stirred at a temperature of 80–85° C. for 2.5 hours. A yellow, oily condensate was obtained. The condensate was washed with water and steam-distilled for one hour. The condensate was extracted with benzene and after evaporation of the benzene, 27 parts by weight of a brown, viscous liquid were recovered.

A plate was coated with a film of this liquid and the coated plate was placed in an oven and treated at a temperature of 160° C. for 2 hours. A very hard, resilient and solvent-resistant film resulted.

Nine parts by weight of the brown, viscous liquid and 18 parts by weight of bodied linseed oil were heated to a temperature of 293° C. and stirred at this temperature for about 25 minutes. A dark, cloudy, viscous oil was obtained. Upon analysis, it was found to contain 3.4% sulfur. Upon thinning with 20 parts by weight of thinner, 3–5 parts by weight of solid precipitated out.

A sample of this material was heated in an oven at a temperature of 150° C. for 2–3 hours. A "thermosetting" type of resin was obtained.

*Example 3*

Sixteen parts by weight of propyl thiophene, 15 parts by weight of a formalin solution containing about 36% formaldehyde (a 3:4 molecular ratio) and 7 parts by weight of 95% sulfuric acid were placed in a glass tube. The tube was sealed and the mixture was shaken for 40 hours at a temperature of 80–85° C. An oily material was separated from the aqueous layer and dehydrated for one hour at 80° C. under 5 mm. vacuum.

Fifteen parts by weight of a red-brown, viscous liquid were recovered. This product could be readily dissolved in benzene, linseed oil, etc.

*Example 4*

Nine parts by weight of di-tertiary amyl thiophene, 4 parts by weight of paraformaldehyde (a 1:3 molecular ratio) and one part by weight of 95% sulfuric acid dissolved in 5 parts by weight of glacial acetic acid were placed in a beaker, and the mixture was stirred for one hour at a temperature of 60–80° C.

Ten parts by weight of a red-brown viscous liquid which was soluble in petroleum ether were recovered.

*Example 5*

Ten parts by weight of tri-tertiary butyl thiophene, 4 parts by weight of paraformaldehyde (a 1:4 molecular ratio), and one part by weight of 95% sulfuric acid dissolved in 5 parts by weight of glacial acetic acid were placed in a beaker, and the mixture was stirred for one hour at a temperature of 60–80° C.

Eleven parts by weight of a red-brown, viscous liquid were recovered. The molecular weight and the sulfur content of this product corresponded to a compound having the following formula:

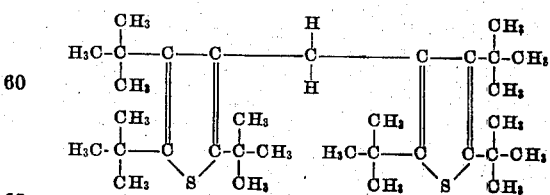

*Example 6*

One hundred parts by weight of methyl thiophene, 60 parts by weight of phenol, 140 parts by weight of a formalin solution containing about 36% formaldehyde, and 5 parts by weight of 95% sulfuric acid were placed in a glass vessel and heated for 5 hours at a temperature of 90–100° C. The product was neutralized with potassium hydroxide and the excess methyl thiophene was distilled off. A liquid resin was obtained.

An aqueous solution of hexamethylenetetramine containing 20 parts by weight of hexamethylenetetramine to 25 parts by weight of water was added to the liquid resin while the latter was still fluid enough to stir. 270 parts by weight of a very viscous, liquid resin were obtained which solidified upon cooling. Upon removal of occluded water, this product was converted to a brittle, easily ground solid. This resin, with or without filler, was converted by heat and pressure into a typical thermosetting resin.

*Example 7*

Nineteen parts by weight of methyl thiophene, 15 parts by weight of a formalin solution containing about 36% formaldehyde, and 5 parts by weight of ammonium chloride were placed in a glass vessel, heated to a temperature of 80° C. and stirred for 3 hours. The product was subjected to vacuum distillation to remove unreacted charge, water, etc. 22 parts by weight of a viscous, brown oil were recovered. This oil set to a hard film when left in an oven at a temperature of 140–150° C. for several hours.

*Example 8*

A solution of 8 parts of sulfuric acid in 16 parts of water (approximately 32% $H_2SO_4$) was added to a mixture of 70 parts of t-butythiophene and 23 parts of paraldehyde and heated with stirring for 72 hours at a reflux temperature of about 60° C. More paraldehyde was added periodically to replace that lost. The product was then separated from the acid layer, washed well with water, dried, and the unreacted t-butylthiophene removed by distillation. 60 parts of a dark, viscous, benzene-soluble resin was obtained.

This application is a continuation-in-part of application Serial Number 562,903, filed November 10, 1944, now abandoned.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. The method of preparing synthetic products, which comprises reacting an alkyl thiophene selected from the group consisting of monoalkyl thiophene, dialkyl thiophene, and trialkyl thiophene, with an aldehyde selected from the group consisting of formaldehyde and paraldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 80% concentration, at temperatures varying between 20° C. and 120° C., and for a period of time sufficient to effect resinification.

2. The method of preparing synthetic products, which comprises reacting an alkyl thiophene selected from the group consisting of monoalkyl thiophene, dialkyl thiophene, and trialkyl thiophene, with an aldehyde selected from the group consisting of formaldehyde and paraldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 60% concentration, at temperatures varying between 40° C. and 100° C., and for a period of time sufficient to effect resinification.

3. The product obtained by reacting an alkyl thiophene selected from the group consisting of monoalkyl thiophene, dialkyl thiophene, and trialkyl thiophene, with an aldehyde selected from the group consisting of formaldehyde and paraldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 60% concentration, at temperatures varying between 40° C. and 100° C., and for a period of time sufficient to effect resinification.

4. The method of preparing synthetic products, which comprises reacting a mixture of phenol and an alkyl thiophene selected from the group consisting of monoalkyl thiophene, dialkyl thiophene, and trialkyl thiophene, wherein the molar ratio of alkyl thiophene to phenol varies between 6:1 and 1:1, with an aldehyde selected from the group consisting of formaldehyde and paraldehyde, in a molar ratio corresponding to at least one mole of aldehyde for each mole of alkyl thiophene and at least one mole of aldehyde for each mole of phenol in said mixture, in the presence of sulfuric acid in amounts of at least 0.1% based on the weight of alkyl thiophene in said mixture, and of water to produce an aqueous solution of sulfuric acid of less than 80% concentration, at temperatures varying between 20° C. and 120° C., and for a period of time sufficient to effect resinification.

5. The method of preparing synthetic products, which comprises reacting a mixture of phenol and an alkyl thiophene selected from the group consisting of monoalkyl thiophene, dialkyl thiophene, and trialkyl thiophene, wherein the molar ratio of alkyl thiophene to phenol varies between 6:1 and 1:1, with an aldehyde selected from the group consisting of formaldehyde and paraldehyde, in a molar ratio corresponding to at least one mole of aldehyde for each mole of alkyl thiophene and at least one mole of aldehyde for each mole of phenol in said mixture, in the presence of sulfuric acid in amounts of at least 0.1% based on the weight of alkyl thiophene in said mixture, and of water to produce an aqueous solution of sulfuric acid of less than 60% concentration, at temperatures varying between 40° C. and 100° C., and for a period of time sufficient to effect resinification.

6. The product obtained by reacting a mixture of phenol and an alkyl thiophene selected from the group consisting of monoalkyl thiophene, dialkyl thiophene, and trialkyl thiophene, wherein the molar ratio of alkyl thiophene to phenol varies between 6:1 and 1:1, with an aldehyde selected from the group consisting of formaldehyde and paraldehyde, in a molar ratio corresponding to at least one mole of aldehyde for each mole of alkyl thiophene and at least one mole of aldehyde for each mole of phenol in said mixture, in the presence of sulfuric acid in amounts of at least 0.1% based on the weight of alkyl thiophene in said mixture, and of water to produce an aqueous solution of sulfuric acid of less than 60% concentration, at temperatures varying between 40° C. and 100° C., and for a period of time sufficient to effect resinification.

7. The method of preparing oil-soluble synthetic products, which comprises reacting a monoalkyl thiophene containing less than three carbon atoms in the side chain, with paraldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 80% concentration, at temperatures varying between 20° C. and 120° C., and for a period of time sufficient to effect resinification.

8. The method of preparing oil-soluble synthetic products, which comprises reacting a monoalkyl thiophene containing less than three carbon atoms in the side chain, with paraldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 60% concentration, at temperatures varying between 40° C. and 100° C., and for a period of time sufficient to effect resinification.

9. The product obtained by reacting a monoalkyl thiophene containing less than three carbon atoms in the side chain, with paraldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 60% concentration, at temperatures varying between 40° C. and 100° C., and for a period of time sufficient to effect resinification.

10. The method of preparing oil-soluble synthetic products, which comprises reacting a monoalkyl thiophene containing from three through five carbon atoms in the side chain, with formaldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 80% concentration, at temperatures varying between 20° C. and 120° C., and for a period of time sufficient to effect resinification.

11. The method of preparing oil-soluble synthetic products, which comprises reacting a monoalkyl thiophene containing from three through five carbon atoms in the side chain, with formaldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 60% concentration, at temperatures varying between 40° C. and 100° C., and for a period of time sufficient to effect resinification.

12. The product obtained by reacting a monoalkyl thiophene containing from three through five carbon atoms in the side chain, with formaldehyde, in a molar ratio corresponding to at least one mole of aldehyde for each mole of alkyl thiophene, in the presence of sulfuric acid in amounts of at least 0.1% based on the weight of alkyl thiophene, and of water to produce an aqueous solution of sulfuric acid of less than 60% concentration, at temperatures varying between 40° C. and 100° C., and for a period of time sufficient to effect resinification.

PHILIP D. CAESAR.

No references cited.